May 30, 1944.    W. VAN B. ROBERTS    2,349,885
OSCILLATION GENERATOR
Filed Oct. 25, 1941
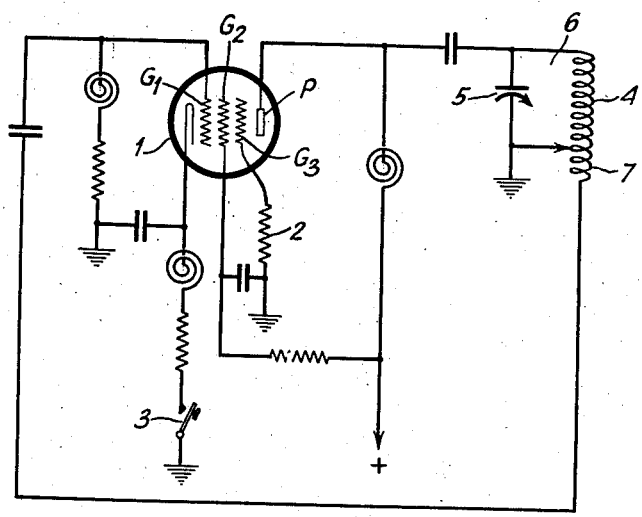
INVENTOR
WALTER VAN B. ROBERTS
BY
ATTORNEY Patented May 30, 1944

2,349,885

UNITED STATES PATENT OFFICE 2,349,885

OSCILLATION GENERATOR

Walter van B. Roberts, Princeton, N. J., assignor to Radio Corporation of America, a corporation of Delaware Application October 25, 1941, Serial No. 416,452

2 Claims. (Cl. 250—36)

The present invention relates to electron tube oscillator circuits, and particularly to a method of and apparatus for improving the frequency stability of such circuits.

The primary object of the present invention is to provide an oscillator circuit which will maintain the generated frequency constant irrespective of variations in the voltages of the sources supplying operating potentials to the electrodes of the oscillator tube.

The present invention finds especial application to keyed oscillators wherein the regulation of the power supply is so poor that the voltage drops appreciably when the key is closed. It should be understood that the invention is not limited to keyed oscillators but has general application.

The invention will be described more particularly with reference to a preferred type of oscillator circuit, wherein a high degree of frequency stability is already assured by a circuit design such that the total volt-amperes flowing in the interelectrode capacities of the tube are nearly as small as possible compared with the volt-amperes in the main frequency determining circuit. Referring to the single figure of the drawing which shows one embodiment of an oscillator according to the invention, this latter condition is obtained in the oscillator employing a multi-grid vacuum tube 1 by using a very large capacity 5 for the tank circuit 6 and a feed back voltage to the control grid $G_1$ obtained from a small coil 7 coupled to the tank circuit, which voltage is small compared with the voltage across the tank circuit. The alternating voltage on the grid $G_1$ is chosen small compared with that on the plate P because the variation in effective grid-cathode capacity is likely to be larger than the variation in the effective output capacity of the tube. However, even with such a design as described, variations of frequency occur when the voltage supplying the screen $G_2$ and the plate P changes by a considerable amount. The operation of key 3 in the cathode circuit will change the power supply voltage supplied to the tube electrodes, in the absence of a circuit for regulating the voltage of the source supplying the operating potentials. It has been observed experimentally in the case of a circuit of the general type shown in the drawing (without benefit of the invention described hereinafter), that the frequency of oscillation will drop slightly when the supply voltage drops. This observation was made when the suppressor-grid $G_3$ was, as is usual, directly grounded and in that case the change of frequency may be explained as follows: Due to the inevitable resistance in the oscillator tank coil 4, the current therethrough does not lag quite 90° behind the plate alternating voltage. Let us say, for example, that the current lags only 89°. Then the voltage induced in a coil coupled by mutual inductance to the tank coil will either lead the plate voltage by 1° or lag by 179°, according to the relative directions of the windings of said coils. In the case shown in the drawing, the voltage delivered to the grid $G_1$ by coil 7 is reversed so that it will lag the plate voltage by 179°. In other words, in addition to the main component of grid voltage, which is in phase opposition to the plate voltage, there is a very small component of grid voltage which lags the plate voltage by 90°. The result of this small component is to make the vacuum tube 1 act not only in its principal manner as an oscillation generator, but also as a "reactance tube"; that is, a tube which acts like a reactance across the tank circuit. The smaller the transconductance of the vacuum tube, the higher this effective reactance becomes, as is well known. Thus, if variation of the plate supply voltage alters the mutual conductance of the tube, it will alter this effective reactance and hence alter the natural frequency of the system. In the past, this effect has been reduced either by careful voltage regulation of the plate power supply or by such relative choice of various electrode potentials that a varying supply voltage does not appreciably change the transconductance of the tube. These expedients, however, do not remove the undesired reactive effect of the vacuum tube but merely attempt to hold it constant.

In accordance with the present invention, the vacuum tube 1 is rendered substantially non-reactive in its action upon the tuned circuit 6 by the introduction of a small voltage which has its chief component leading the alternating plate voltage by 90°. This voltage is arranged to control the electron flow within the tube and its magnitude is adjusted so that its control action is substantially equal and opposite to that of the small lagging component of control voltage previously described. I have found that such a compensating leading voltage may be obtained, very simply, by the introduction of a small amount of unbypassed resistance 2 between the suppressor grid $G_3$ and ground, as shown in the drawing. The alternating plate voltage may be considered as being impressed upon this resistance by way of the internal tube capacity between the plate P and suppressor $G_3$. Since this capacity is small, so that its reactance is large compared with the aforesaid resistance, the phase of the current through the resistance will be almost 90° ahead of that of the plate voltage and hence the suppressor grid voltage will lead the plate alternating voltage by approximately 90°. I have found that if this resistance is increased beyond a few hundred ohms, the frequency of oscillation rises as the plate supply voltage falls, but that for a certain value of resistance, which value must be experimentally determined for any particular set up, the frequency is substantially independent of supply voltage over a rather large range of variation of this voltage.

In one embodiment of the invention successfully tried out in practice, I employed an RCA-802 tube, capacitor 5 was 500 mmf., coil 4 had twenty turns, coil 7 had five turns, both coils having a diameter of one and one-half inches; resistor 2 was around 400 ohms and was not critical in value; the grid and plate blocking condensers were 100 mmf. and 1000 mmf., respectively; the cathode resistor in series with the key was 750 ohms and the screen resistor was 16,000 ohms. In such a circuit, the fundamental frequency of the oscillations produced was about 1000 kc.

While I have indicated one means for preventing the oscillator tube from acting as a reactance element across the tuned circuit, it will be appreciated that a similar result may be obtained in other ways without involving the necessity of stabilizing the plate voltage or of stabilizing the transconductance of the tube with respect to varying plate voltage. For example, I have found that a resistance inserted anywhere in the circuit connecting the grid and the feed back coil will produce substantially the same result by introducing a slight shift in the phase of the voltage fed back to the grid. This phase shift may be looked upon as the introduction of a small component voltage in opposition to the small component previously described as being responsible for the frequency shift of the oscillator. Again, I have found that a suitable amount of unbypassed resistance connected between the screen and the screen by-pass condenser will produce quite similar results. In every case, increasing the resistor in question too much will cause a reversal of the direction of frequency shift, thus indicating that the basic action is equivalent in each case.

The term "ground" is herein used to indicate any point or surface of fixed or zero alternating current potential, while the term "unbypassed" refers to an element which is not shunted by a capacity or path of low impedance to energy of the operating frequency.

What is claimed is:

1. In an oscillator including a tube having a cathode, plate, control grid and at least one other cold electrode adapted to control the flow of current to said plate, and including a tank circuit wherein the volt-amperes are very large compared with the volt-amperes flowing in the capacities between said electrodes to thereby stabilize the frequency of oscillation, a coupling from the plate-cathode circuit to said tank and a coupling from said tank to the control grid-cathode circuit of said tube, said couplings being arranged to cause the alternating voltages on said grid and plate to be substantially 180° out-of-phase but due to losses in said oscillator system being not exactly 180° out-of-phase, and means for producing an out-of-phase voltage on said additional cold electrode adapted to compensate for the aforesaid departure from the 180° phase relation consisting solely of an unbypassed resistor connected between said cold electrode and a point of zero radio frequency potential, said resistor being chosen too small to substantially alter the direct potential of said cold electrode but sufficiently large to produce a small alternating voltage on said cold electrode which is out-of-phase with the voltage on said grid and which thereby slightly alters the phase of the alternating current to said plate and thus causes the resulting phase of said plate current to be exactly opposite to that of the said alternating plate voltage.

2. An oscillator system in accordance with claim 1, characterized in this that said cold electrode is the suppressor grid of a pentode tube.

WALTER van B. ROBERTS.